United States Patent
Itoh

(10) Patent No.: US 11,827,239 B2
(45) Date of Patent: Nov. 28, 2023

(54) AUTONOMOUS DRIVING CONTROL APPARATUS

(71) Applicant: DENSO CORPORATION, Kariya (JP)

(72) Inventor: Akira Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 242 days.

(21) Appl. No.: 16/854,279

(22) Filed: Apr. 21, 2020

(65) Prior Publication Data
US 2020/0331492 A1 Oct. 22, 2020

(30) Foreign Application Priority Data

Apr. 22, 2019 (JP) .................................. 2019-081078
Apr. 9, 2020 (JP) .................................. 2020-070138

(51) Int. Cl.
*B60W 60/00* (2020.01)
*B60W 50/08* (2020.01)

(52) U.S. Cl.
CPC ...... *B60W 60/0011* (2020.02); *B60W 50/082* (2013.01); *B60W 50/085* (2013.01)

(58) Field of Classification Search
CPC .......... B60W 60/0011; B60W 50/082; B60W 50/085; B60W 60/00; B60W 2050/0005; B60W 2050/0006; B60W 50/06
See application file for complete search history.

(56) References Cited

U.S. PATENT DOCUMENTS

| | | | |
|---|---|---|---|
| 10,379,538 B1* | 8/2019 | Sheckells | B60W 10/20 |
| 2007/0169007 A1 | 7/2007 | Hashimoto et al. | |
| 2017/0132934 A1* | 5/2017 | Kentley | G08G 1/202 |
| 2017/0232970 A1* | 8/2017 | Schaper | G08G 1/167 701/36 |
| 2018/0209801 A1* | 7/2018 | Stentz | G01C 21/3415 |
| 2020/0285244 A1* | 9/2020 | Gier | G05D 1/0246 |
| 2020/0346666 A1* | 11/2020 | Wray | G01C 21/3407 |

FOREIGN PATENT DOCUMENTS

| | | |
|---|---|---|
| JP | 2005-186762 A | 7/2005 |
| WO | WO-2019088989 A1 * 5/2019 | ........ B60W 60/0011 |

* cited by examiner

*Primary Examiner* — James J Lee
*Assistant Examiner* — Alexander George Matta
(74) *Attorney, Agent, or Firm* — MASCHOFF BRENNAN

(57) ABSTRACT

In an autonomous driving control apparatus, a control unit controls autonomous driving that causes a vehicle to travel along a scheduled travel route. A storage unit stores driving-operation modules. Each of the driving-operation modules is comprised of a modularized set of a sequence of input/output operations used by a corresponding driving operation carried out by the autonomous driving. The control unit determines the scheduled travel route, and determines, in accordance with the scheduled travel route, at least one selected driving-operation module from the driving-operation modules stored in the storage unit. The control unit performs the at least one selected driving-operation module to thereby cause the vehicle to perform the autonomous driving.

7 Claims, 8 Drawing Sheets

| DRIVING-OPERATION MODULE | TARGET DEVICE FOR INPUT/OUTPUT OPERATIONS |
|---|---|
| MD1 | E1,E7,E8,E9,E10 |
| MD2 | E3,E5,E6,E7,E9 |
| ⋮ | ⋮ |
| MD10 | E2,E4,E5,E6,E8 |

AUTONOMOUS DRIVING CONTROL APPARATUS

CROSS REFERENCE TO RELATED APPLICATIONS

This application is based on and claims the benefit of priority from Japanese Patent Application No. 2019-081078 filed on Apr. 22, 2019 and No. 2020-070138 filed on Apr. 9, 2020, the disclosure of which are incorporated in their entirety herein by reference.

TECHNICAL FIELD

The present disclosure relates to autonomous driving control apparatuses.

BACKGROUND

Autonomous driving control apparatuses control autonomous driving of an autonomous vehicle. An example of these autonomous driving control apparatuses includes a drive system for driving the autonomous vehicle to thereby cause the autonomous vehicle to travel, a braking system for slowing down the autonomous vehicle, and a steering system for steering a steering of the autonomous vehicle, or assisting a driver's steering operation of a steering wheel of the autonomous vehicle.

SUMMARY

An exemplary aspect of the present disclosure provides an autonomous driving control apparatus for a vehicle. The autonomous driving control apparatus is configured to determine, in accordance with a scheduled travel route, at least one selected driving-operation module from driving-operation modules stored in a storage unit, and perform the at least one selected driving-operation module to thereby cause the vehicle to perform autonomous driving.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT VIEWPOINT

Figure 1:
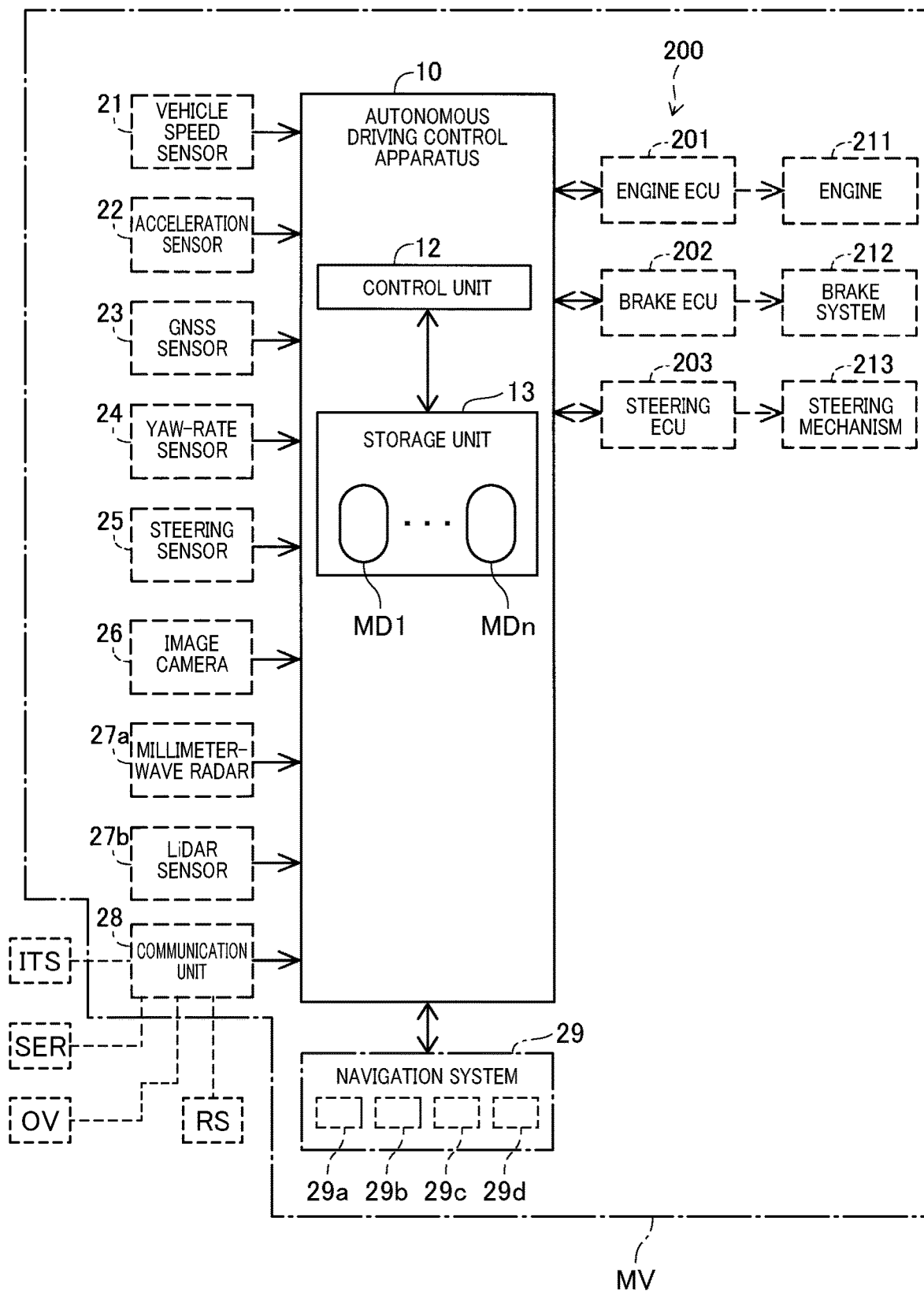
FIG. 1 is a block diagram schematically illustrating an example of the overall structure of a driving system and an autonomous driving control apparatus according to the first embodiment of the present disclosure.

An example of autonomous driving control apparatuses, which is disclosed in Japanese Patent Application Publication No. 2005-186762, includes a drive system for driving the autonomous vehicle to thereby cause the autonomous vehicle to travel, a braking system for slowing down the autonomous vehicle, and a steering system for steering a steering of the autonomous vehicle, or assisting a driver's steering operation of a steering wheel of the autonomous vehicle. The above patent publication discloses first, second, and third subsystems for controlling the respective drive system, brake system, and steering system to thereby perform autonomous driving of the autonomous vehicle.

Such an autonomous driving control apparatus includes sensor devices and actuator devices, receives measurements measured by the respective sensor devices, and outputs, based on the received measurements, at least one controlled instruction to a corresponding at least one of the actuator devices, thus causing the autonomous vehicle to perform one of driving operations, i.e. driving behaviors, including forward travelling, rearward travelling, right turning, and left turning.

For example, when causing the autonomous vehicle to perform right turning, the autonomous driving control apparatus receives, from one or more cameras, one or more millimeter-wave radars, and one or more LiDAR sensors, which are examples of the sensor devices, surrounding-condition information items indicative of surrounding conditions around the autonomous vehicle. Then, the autonomous driving control apparatus outputs at least one of 1. A controlled driving instruction to at least one of an engine, a motor, and a brake system, which are examples of the actuator devices 2. A controlled steering instruction to a steering system including a steering wheel, which is an example of the actuator devices Unfortunately, the above autonomous driving control apparatus may have to perform information exchange many times with respect to both the sensor devices and the actuator devices when causing the autonomous vehicle to perform a selected one of the driving operations, resulting in many user's requests for more efficiently causing the autonomous vehicle to perform the autonomous operations.

In view of the circumstances set forth above, an aspect of the present disclosure seeks to provide autonomous driving control apparatuses, each of which is capable of addressing the user's requests.

According to a first exemplary aspect of the present disclosure, there is provided an autonomous driving control apparatus. The autonomous driving control apparatus includes a control unit configured to control autonomous driving that causes a vehicle to travel along a scheduled travel route, and a storage unit configured to store a plurality of driving-operation modules. Each of the driving-operation modules is comprised of a modularized set of a sequence of input/output operations used by a corresponding driving operation carried out by the autonomous driving.

The control unit according to the first exemplary aspect is configured to determine the scheduled travel route, determine, in accordance with the scheduled travel route, at least one selected driving-operation module from the driving-operation modules stored in the storage unit, and perform the at least one selected driving-operation module to thereby cause the vehicle to perform the autonomous driving.

According to a second exemplary aspect of the present disclosure, there is provided a method of controlling a vehicle. The method includes (a) Determining a scheduled travel route of a vehicle (b) Determining, in accordance with the scheduled travel route, at least one driving-operation module, the at least one driving-operation module being associated with a sequence of input/output operations (c) Performing the sequence of input/output operations associated with the at least one driving-operation module to thereby cause the vehicle to perform autonomous driving According to a second exemplary aspect of the present disclosure, there is provided a computer-readable storage medium including a set of computer program instructions. The instructions cause a computer to carry out 1. A first step of determining a scheduled travel route of a vehicle 2. A second step of determining, in accordance with the scheduled travel route, at least one driving-operation module, the at least one driving-operation module being associated with a sequence of input/output operations 3. A third step of performing the sequence of input/output operations associated with the at least one driving-operation module to thereby cause the vehicle to perform autonomous driving.

Each of the autonomous driving control apparatus, method, and storage medium includes the driving-operation modules; each of driving-operation modules the modularized set of the input/output operations used by the corresponding driving operation of the vehicle.

This configuration enables the input/output operations carried out by the control unit to be more efficient than a comparative control unit including no drive-operation modules.

Embodiments

The following describes exemplary embodiments of the present disclosure with reference to the accompanying drawings. In the embodiments, like parts between the embodiments, to which like reference characters are assigned, are omitted or simplified to avoid redundant description.

First Embodiment

The following describes an example of the configuration of each of an autonomous driving control apparatus 10 and a driving system 100 according to the first embodiment of the present disclosure with reference to FIG. 1.

Referring to FIG. 1, the driving system 100 is for example installed in an autonomous vehicle MV, which is controlled to autonomously travel. The driving system 100 is configured to assist and/or perform autonomous driving of the vehicle MV. Note that the vehicle MV in which the autonomous driving system 100 is installed will also be referred to as an own vehicle MV or a simply referred to as a vehicle MV.

The vehicle MV has installed therein the autonomous driving control apparatus 10 communicable with the driving system 100; the autonomous driving control apparatus 10 is comprised of, for example, an electronic control unit (ECU) as its main component.

The ECU is designed as, for example, a microcomputer including a control unit 12 and a storage unit 14 communicable with each other.

The control unit 12 is configured to control autonomous driving that causes the autonomous vehicle MV to travel on a scheduled travel route. Specifically, the control unit 12 is comprised of a processor, such as a CPU. The control unit 12 can be comprised of another type of processor, such as an application specific integrated circuit (ASIC). The storage unit 14 includes, for example, non-transitory tangible storage media that include, for example, a random-access memory (RAM) and a read only memory (ROM).

Various control programs including control programs for causing the control unit 12 to perform various tasks, i.e. routines, are stored in the storage unit 14. In addition, various data items usable by the control unit 12 are also stored in the storage unit 14. The control unit 12 reads at least one of the control programs from the storage unit 14, and executes the at least one program to thereby execute the routine corresponding to the at least one control program. In other words, the control unit 12 executes the at least one control program to thereby implement predetermined functional modules based on the at least one control program. In addition, the control unit 12 is configured to control overall operations of the autonomous driving control apparatus 10.

The own vehicle MV is configured to have an engine 211, a brake system 212, and a steering mechanism 213, and is controlled to switchably operate in an autonomous driving mode and a manual mode, that is, a manually operated mode. For example, a switch can be mounted to an instrument panel of the vehicle MV; this switch enables a driver's operation to send, to the control unit 12 therefrom, a selection signal indicative of one of the autonomous driving mode and manual mode as an operation mode of the vehicle MV.

The autonomous driving mode represents the operation mode of the vehicle MV in which control of the engine 211, control of the brake system 212 installed in the vehicle MV, and control of the steering mechanism 213 of the vehicle MV are autonomously performed without driver's driving operations to thereby cause the vehicle MV to autonomously travel or stop.

In contrast, the manual mode represents the operation mode of the vehicle MV in which operation of the engine 211, such as operation of an accelerator pedal of the vehicle MV linked to the engine 211, operation of the brake system 212, such as operation of a brake pedal of the vehicle MV linked to the brake system, and operation of the steering mechanism 213, such as operation of a steering wheel of the vehicle MV, are performed by a driver of the vehicle MV.

The driving system 100 includes, for example, a vehicle speed sensor 21, an acceleration sensor 22, a global navigation satellite system (GNSS) sensor 23, a yaw rate sensor 24, a steering sensor 25, image cameras 26, millimeter-wave radars 27a, light detection and ranging or an imaging detection and ranging (LiDAR) sensors 27b, a communication unit 28, and a navigation system 29. These components 21, 22, 23, 24, 25, 26, 27a, 27b, 28, and 29 are communicably connected to the autonomous driving control apparatus 10.

The driving system 100 also includes a drive control apparatus 200 communicably connected to the autonomous driving control apparatus 10.

Note that the autonomous driving control apparatus 10 can include one or more components of the driving system 100.

Measurements obtained by the above sensors 21 to 27b and information received by the communication unit 28 are sent to the autonomous control apparatus 10, and the autonomous control apparatus 10 is configured to instruct, based on the measurements and information, the driving control apparatus 20 to control the engine 211, the brake system 212, and the steering mechanism 213 for causing the vehicle MV to autonomously travel.

The vehicle speed sensor 21 is configured to measure a value of the speed of the own vehicle MV, and send a measurement signal indicative of the value of the speed of the own vehicle MV to the autonomous driving control apparatus 10.

The acceleration sensor 22 is configured to measure a value of acceleration of the own vehicle MV, and send a measurement signal indicative of the value of the acceleration of the own vehicle MV to the autonomous driving control apparatus 10.

The GNSS sensor 23 is comprised of, for example, a global positioning system (GPS) receiver. The GPS receiver is configured to receive, via a GPS antenna, GPS signals, which are sent from GPS satellites, to thereby calculate for example the latitude and longitude of the position of the GPS antenna of the vehicle MV based on the received GPS signals as position data of the GPS antenna.

The GNSS sensor unit 23 is configured to calculate, as a current position of the vehicle MV, based on the GPS signals, and send a measurement signal indicative of the current position of the vehicle MV to the autonomous driving control apparatus 10.

The yaw rate sensor 24 is configured to measure an angular velocity of the vehicle MV around its vertical axis, and send a measurement signal indicative of the angular velocity of the vehicle MV to the autonomous driving control apparatus 10. The steering sensor 25 is configured to measure a steering angle of the steering wheel of the vehicle MV, and sent a measurement single indicative of the steering angle to the autonomous driving control apparatus 10.

The image cameras 26 include a front camera mounted to the front of the vehicle MV. The front camera is configured to capture images, i.e. front images, of a front view of the vehicle MV, and send, to the autonomous driving control apparatus 10, the captured front images.

In addition, the image cameras 26 include a rear camera, a left camera, and a right camera. The rear camera is configured to capture images, i.e. rear images, of a rear view of the vehicle MV, and send, to the autonomous driving control apparatus 10, the captured rear images. The left camera is configured to capture images, i.e. left images, of a left-side view of the vehicle MV, and send, to the autonomous driving control apparatus 10, the captured left images. The right camera is configured to capture images, i.e. right images, of a right-side view of the vehicle MV, and send, to the autonomous driving control apparatus 10, the captured right images.

A monocular camera can be used as each image camera 26. A stereo camera comprised of two or more cameras or a multi camera can be used as each image camera 26.

Each millimeter-wave radar 27a is configured to (1) Transmit, to a predetermined corresponding surrounding region of the vehicle MV, millimeter radio waves as probing waves (2) Receive reflection radio waves, i.e. echoes, generated based on reflection of the transmitted millimeter radio waves by objects located around the vehicle MV (3) Detect, based on the received reflection radio waves, the existence, location, size, distance, and/or relative speed of each of the objects relative to the vehicle MV Note that each object is detected by the millimeter-wave radars 27a as the collection of detected points on the corresponding object.

Each LiDAR 27b is configured to (1) Transmit, to a predetermined corresponding surrounding region of the vehicle MV, laser waves as probing waves (2) Receive reflection laser waves, i.e. echoes, generated based on reflection of the transmitted laser waves by objects located around the vehicle MV (3) Detect, based on the received reflection laser waves, the existence, location, size, distance, and/or relative speed of each of the objects relative to the vehicle MV For example, the millimeter-wave radars 27a include a front millimeter-wave radar to transmit, to a front region of the vehicle MV, the millimeter radio waves, a rear millimeter-wave radar to transmit, to a rear region of the vehicle MV, the millimeter radio waves, a left millimeter-wave radar to transmit, to a left-side region of the vehicle MV, the millimeter radio waves, and a right millimeter-wave radar to transmit, to a right-side region of the vehicle MV, the millimeter radio waves.

Similarly, the LiDAR sensors 27b for example include a front LiDAR sensor to transmit, to a front region of the vehicle MV, the laser waves, a rear LiDAR sensor to transmit, to a rear region of the vehicle MV, the laser waves, a left LiDAR sensor to transmit, to a left-side region of the vehicle MV, the laser waves, and a right LiDAR sensor to transmit, to a right-side region of the vehicle MV, the laser waves.

The communication unit 28 is configured to perform inter-vehicle communications by wirelessly communicating with other vehicles OV located around the own vehicle MV to thereby (1) Send, to each of the other vehicles, own-vehicle information including driving conditions and surrounding conditions of the vehicle MV (2) Receive, from each of the other vehicles OV, other-vehicle information including driving conditions and surrounding conditions of the corresponding other vehicle OV The communication unit 28 can be configured to perform at least one of 1. Radio communications with an intelligent transport system (ITS) to thereby communicate with the other vehicles OV via the ITS 2. Radio communications with each of the other vehicles OV 3. Radio communications with roadside radio stations RS located on roadsides to thereby communicate with the other vehicles OV via the roadside radio stations RS The communication unit 28 also enables the autonomous driving control apparatus 10 to communicate, by radio, with one or more traffic servers SER established outside the vehicle MV to thereby obtain (1) Traffic condition information
(2) Weather condition information The weather condition information represents, for example, the weather condition, such as a bright condition, a rain condition, a cloud condition, a snow condition, a fog condition, or a sandstorm condition around the vehicle MV, which can be collected by at least one of the traffic servers SER.

The traffic condition information for example includes various types of traffic information about each road on which the vehicle MV can travel.

For example, the traffic condition information can include
1. Map information items about many roads that the vehicle MV can travel
2. Accident information indicative of whether an accident has occurred on at least one of the roads that the vehicle MV can travel
3. Regulation information including a speed limit of each travelable road, information about whether passing is permitted for each travelable road, and information about whether there are traffic regulations for each travelable road The navigation system 29 includes a display unit 29a, a sound speaker 29b, an input unit 29c, and a large-capacity storage 29d, and is configured to store, in the large-capacity storage 29d, various road information items and map information items about many roads that the vehicle MV is travelable. The display unit 29a, speaker 29b, and the input unit 29c can constitute a human machine interface (HMI) unit. The navigation system 29 can use an HMI unit previously installed in the autonomous vehicle MV.

Specifically, the navigation system 29 is configured to continuously display a road map on the display unit 29a around the current position of the vehicle MV, and display, on the road map, a selected route from the current position of the vehicle MV to a destination in response to when a driver of the vehicle MV inputs the destination using the input unit 29c.

In particular, the navigation system 29 is configured to determine the selected route from the current position of the vehicle MV to the destination upon the vehicle MV being controlled in the manual mode. In contrast, the autonomous driving control apparatus 10 is configured to determine the selected route from the current position of the vehicle MV to the destination upon the vehicle MV being controlled in the autonomous driving mode.

The navigation system 29 is configured to obtain the road information about one or more roads included in the selected route, and provide the road information to the autonomous driving control apparatus 10. The navigation system 29 is also configured to provide, to a driver of the vehicle MV, a visible and audible guidance for enabling the vehicle MV to travel along the selected route using the display unit 29a and the sound speaker 29b.

The drive control apparatus 200 serves as, for example, a controller that controls operations of the own vehicle MV.

Specifically, the drive control apparatus 200 includes an engine ECU 201, a brake ECU 202, and a steering ECU 203.

The engine ECU 201 is configured to control operations of the engine 211. The engine 211 is comprised of an internal combustion engine, a motor, or both an internal combustion engine and a motor.

Specifically, the engine ECU 201 is configured to control various actuators of the internal combustion engine installed in the vehicle MV as the engine 211 to thereby adjust 1. An open or close operation of a throttle valve of the engine 211
2. A fuel injection operation of each injector for spraying a controlled quantity of fuel into a corresponding one of cylinders of the engine 211
3. Ignition by each igniter for igniting the compressed air-fuel mixture or the mixture of the compressed air and fuel in a corresponding one of the cylinders of the engine 211
4. An open or close operation of each intake valve of the engine 211

The above control operations of the engine 211 burn the compressed air-fuel mixture or the mixture of the compressed air and fuel in each cylinder of the engine 211, thus outputting controlled drive power to thereby rotatably drive driving wheels of the vehicle MV.

The engine ECU 201 is also configured to control the motor installed in the vehicle MV as the engine 211 to thereby output controlled drive power to thereby rotatably drive the driving wheels of the vehicle MV.

In addition, the engine ECU 201 is further configured to control both the internal combustion engine and motor each of which is installed in the vehicle MV as the engine 211 to thereby rotatably drive the driving wheels of the vehicle MV.

Note that, upon the operation mode of the vehicle MV being set to the manual mode, the engine ECU 201 is configured to control the engine 211 to cause the engine 211 to generate drive power based on an operated amount of an accelerator pedal operated by a driver of the vehicle MV, thus rotatably driving the driving wheels based on the generated drive power.

In contrast, upon the operation mode of the vehicle MV being set to the autonomous driving mode, the engine ECU 201 is configured to control the engine 211 to cause the engine 211 to generate drive power based on requested drive power instructed from the autonomous driving control apparatus 10, thus rotatably driving the driving wheels based on the generated drive power.

The brake system 212 includes various sensors and actuators; these actuators include motors, valves, and pumps, which are linked to each other and configured to brake the vehicle MV.

The brake ECU 202 is configured to
1. Determine a predetermined timing and a predetermined amount of braking in accordance with an operated timing and amount of a brake pedal operated by a driver of the vehicle MV when the operation mode of the vehicle MV is set to the manual mode
2. Control each of the actuators based on measurement values of the respective sensors and the determined timing and amount of braking to thereby slow down the vehicle MV based on the generated brake power at the determined timing The brake ECU 202 is also configured to
1. Determine a predetermined timing and a predetermined amount of braking in accordance with instructions sent from the autonomous driving control apparatus 10 when the operation mode of the vehicle MV is set to the autonomous driving mode
2. Control each of the actuators based on measurement values of the respective sensors and the determined timing and amount of braking to thereby slow down the vehicle MV based on the generated brake power at the determined timing The steering mechanism 213 includes one or more actuators configured to generate assist torque for assisting a driver's steering operation of the steering wheel or steering torque for steering the steering wheel.

The steering ECU 203 is configured to determine assist torque or an assist steering angle based on the measurements of the respective yaw rate sensor 24 and steering sensor 25 to thereby cause the one or more actuators to generate the assist steering torque upon the operation mode of the vehicle MV being set to the manual mode. This assist torque assists the driver's steering operation of the steering wheel.

The steering ECU 203 is also configured to determine steering torque or steering angle based on the measurements of the respective yaw rate sensor 24 and steering sensor 25 to thereby cause the one or more actuators to generate the steering torque upon the operation mode of the vehicle MV being set to the autonomous driving mode. This steering torque turns the steering wheel.

Next, the following describes an example of the configuration of the autonomous driving control apparatus 10.

Referring to FIG. 1, the autonomous driving control apparatus 10 includes the control unit 12 and the storage unit 14.

As described above, the control unit 12 is configured to receive the measurement signals sent from the respective sensors 21 to 27b, information sent from the communication unit 28, and information sent from the navigation system 29, and send, to at least one of the engine ECU 201, brake ECU 202, and steering ECU 203, an instruction; the instruction causes the at least one of the engine ECU 201, brake ECU 202, and steering ECU 203 to control at least one of the engine 211, brake system 212, and steering mechanism 213, thus causing the vehicle MV to perform driving operations or driving behaviors including (i) forward travelling, (ii) rearward travelling, (iii) right turning, (iv) left turning, (v) stopping, and other various driving operations.

That is, the control unit 12 is configured to perform input/output operations from and/or to the components 21 to 29 and 201 to 203 or other components, which are unillustrated in FIG. 1, to thereby control autonomous driving of the vehicle MV upon the operation mode of the vehicle MV being set to the autonomous driving mode.

The input/output operations include (a) One or more receiving operations of one or more inputs associated with the operation conditions of the autonomous vehicle MV (b) One or more receiving operations of one or more inputs from at least one of surrounding observation sensors, which include, for example, the image cameras 26, the millimeter-wave sensors 27a, and the LiDAR sensors 27b, for observing the surrounding conditions around the autonomous vehicle MV (c) One or more output operations for one or more notifications to the interior or exterior of the autonomous vehicle MV (d) One or more output operations for controlling how the autonomous vehicle MV moves In particular, the storage unit 14 of the autonomous driving control apparatus 10 is configured to store various driving-operation modules (see MD1 to MDn in FIG. 1) for the respective driving operations of the autonomous vehicle MV. Each of the driving-operation modules MD1 to MDn is comprised of a modularized set of a sequence of input/output operations used by the corresponding one of the driving operations of the autonomous vehicle MV.

Note that the input/output operations include at least one of

1. An operation of receiving information input to the control unit 12

2. An operation of outputting information from the control unit 12

The driving operations of the autonomous vehicle MV, each of which represents a unit of a corresponding driving function, for example include (i) Forward travelling
(ii) Rearward travelling
(iii) Right turning
(iv) Left turning
(v) Stopping
(vi) Making a stopover at a convenience store on a previously scheduled route to a destination
(vii) A lane change
(viii) An entrance to an electronic toll collection (ETC) gate
(ix) An exit from an ETC gate As described above, each of the input/output operations included in a corresponding modularized set includes at least one of (a) One or more receiving operations of one or more inputs associated with the operation conditions of the autonomous vehicle MV (b) One or more receiving operations of one or more inputs from at least one of surrounding observation sensors, which include, for example, the image cameras 26, the millimeter-wave sensors 27a, and the LiDAR sensors 27b, for observing the surrounding conditions around the autonomous vehicle MV (c) One or more output operations for one or more notifications to the interior or exterior of the autonomous vehicle MV (d) One or more output operations for controlling how the autonomous vehicle MV moves The operation conditions of the autonomous vehicle MV include, for example, the speed, i.e. the movement speed, of the autonomous vehicle MV measured by, for example, the vehicle speed sensor 21, the current position of the autonomous vehicle MV measured by, for example, the GNSS sensor unit 23, and the steering angle of the autonomous vehicle MV measured by, for example, the steering sensor 25.

The one or more inputs from at least one of surrounding observation sensors represent, for example, surrounding conditions and/or environments around the autonomous vehicle MV.

The one or more output operations for one or more notifications to the one or more occupants in the autonomous vehicle MV for example include (a) on or off output instructions to respective blinkers, i.e. direction indicators, of the autonomous vehicle MV, and (b) audible and/or visible output signals to, for example, the sound speaker 29b and/or the display unit 29a.

The one or more output operations for controlling how the autonomous vehicle MV moves include, for example, a speed control instruction with a target speed and a steering control instruction with a target steering angle of the autonomous vehicle MV to be sent to the drive control apparatus 200.

For example, a selected driving-operation module associated with the driving operation "forward travelling" include 1. The receiving operation of receiving the current position of the autonomous vehicle MV 2. The receiving operation of receiving the current steering angle of the autonomous vehicle MV 3. An operation of detecting lane markers on the road on which the autonomous vehicle MV is travelling in accordance with a front image of the autonomous vehicle MV captured by the front camera 26 and/or measurement information measured by at least one of the front millimeter-wave radar 27*a* and the front LiDAR sensor 27*b*

4. The output operation of outputting the steering control instruction including the target steering angle; the steering control instruction is determined based on the current position of the autonomous vehicle MV and the detected positions of the respective lane markers Next, the following describes, using FIGS. 2 and 3

1. A comparative example where input/output operations used by the driving operations of the autonomous vehicle MV are not modularized 2. A first specific example of the first embodiment where a set of input/output operations used by each the driving operations of the autonomous vehicle MV is modularized for the corresponding one of the driving operations First, the following describes the comparative example with reference to FIG. 2.

Figure 2:
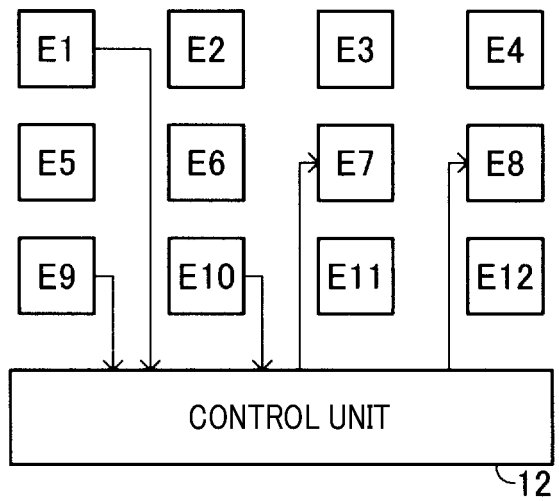
FIG. 2 is a conceptual diagram schematically illustrating how a control unit illustrated in FIG. 1 exchanges data and/or information with devices upon input/output operations between the control unit and the devices being not modularized.

FIG. 2 conceptually illustrates how the control unit 12 exchanges data and/or information with devices E1 to E12 installed in the autonomous vehicle MV upon input/output operations between the control unit 12 and the devices E1 to E12 being not modularized.

In particular, FIG. 2 schematically illustrates the non-modularized input/output operations between the control unit 12 and some of the devices E1 to E12 when the control unit 12 performs a selected driving operation D1 on the assumption that the devices E1 to E12 correspond to, the components 21 to 27*a*, 27*b*, 28, 29, 201 to 203, and one or more other components installed in the autonomous vehicle MV.

That is, for facilitating the understanding of how the control unit 12 exchanges data and/or information with at least one selected device in the devices E1 to E12 when performing a selected driving operation D1, the autonomous vehicle MV includes the devices E1 to E12 required for the autonomous vehicle MV to perform all the driving operations. Although FIG. 2 illustrates only the twelve devices E1 to E12, the control unit 12 can exchange data and/or information with more or fewer than twelve devices.

In FIG. 2, arrowed solid lines connecting among some of the devices E1 to E12 and the control unit 12 represent the input/output operations thereamong when the control unit 12 causes the autonomous vehicle MV to perform the selected driving operation D1.

Specifically, when causing the autonomous vehicle MV to perform the selected driving operation D1, the control unit 12 performs the input/output operations including a receiving operation of receiving input information from each of the devices E1, E9, and E10, and an output operation of outputting an instruction to each of the devices E7 and E8. Each arrowed solid line represents a corresponding input operation or a corresponding output operation exchanged between a corresponding device and the control unit 12.

That is, for causing the autonomous vehicle MV to perform a selected driving operation, the control unit 12 performs input/output operations with respect to one or more devices in the devices E1 to E12; the one or more devices are required for the autonomous vehicle MV to perform the selected driving operation. The input/output operations cause the autonomous vehicle MV to perform the selected driving operation.

Figure 3:
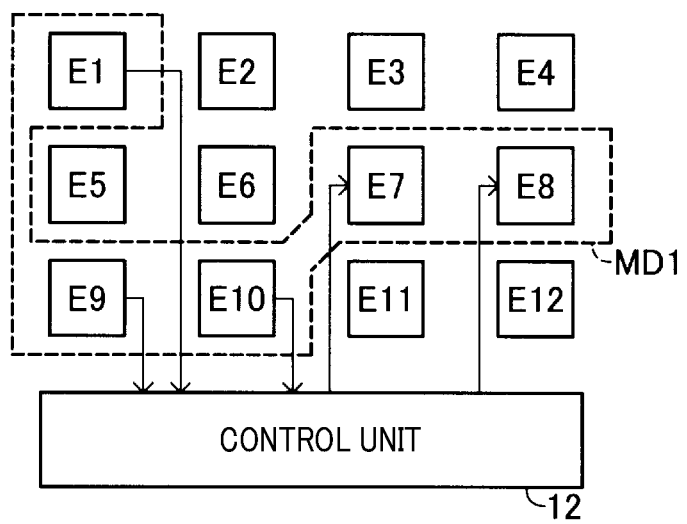
FIG. 3 is a conceptual diagram schematically illustrating an example of how the control unit exchanges data and/or information with the devices upon input/output operations between the control unit and the devices being modularized.

Next, the following describes the first specific example of the first embodiment with reference to FIG. 3.

FIG. 3 conceptually illustrates how the control unit 12 exchanges data and/or information with the devices E1 to E12 installed in the autonomous vehicle MV, which are the same as those illustrated in FIG. 2, when the control unit 12 performs the selected driving operation D1 on the assumption that the set of input/output operations used by each of the driving operations of the autonomous vehicle MV is modularized for a corresponding one of the driving operations.

Like FIG. 2, in FIG. 3, arrowed solid lines connecting among some of the devices E1 to E12 and the control unit 12 represent the input/output operations thereamong when the control unit 12 causes the autonomous vehicle MV to perform the selected driving operation D1. In FIG. 3, each arrowed solid line, which represents a corresponding input operation or a corresponding output operation exchanged between a corresponding device and the control unit 12, is identical to the corresponding arrowed solid line illustrated in FIG. 2.

As described above, the driving-operation modules MD1 to MD*n* for the respective driving operations of the autonomous vehicle MV are stored in the storage unit 14. Each of the driving-operation modules MD1 to MD*n* is comprised of a modularized set of a sequence of input/output operations used by the corresponding one of the driving operations of the autonomous vehicle MV.

For example, the modularized set of a sequence of input/output operations used by the driving operation D1 includes input and output operations among the control unit 12 and the devices E1, E7, E8, E9, and E10. That is, the drive-operation module MD1, which corresponds to the driving operation D1, includes the modularized set of the sequence of the input and output operations among the control unit 12 and the devices E1, E7, E8, E9, and E10.

In FIG. 3, the control unit 12 of the first embodiment is configured to select, from the drive-operation modules MD1 to MD*n* stored in the storage unit 14, one of the drive-operation modules MD1 to MD*n* as a selected drive-operation module corresponding to a driving operation to be performed, and performs the input/output operations modularized in the selected driving-operation module.

For example, the control unit 12 is configured to select, from the drive-operation modules MD1 to MD*n* stored in the storage unit 14, the drive-operation module MD1 corresponding to the driving operation D1 to be performed, and performs the input/output operations modularized in the selected driving-operation module MD1, thus 1. Receiving input information from each of the devices E1, E9, and E10

2. Outputting an instruction to each of the devices E7 and E8

As described above, the autonomous driving control apparatus 10 is configured to include the driving-operation modules MD1 to MD*n*, each of which is comprised of a modularized set of input/output operations used by the corresponding one of the driving operations of the autonomous vehicle MV.

This configuration enables the input/output operations carried out by the control unit 12 to be more efficiently performed than by a comparative control unit including no drive-operation modules.

Figure 4:
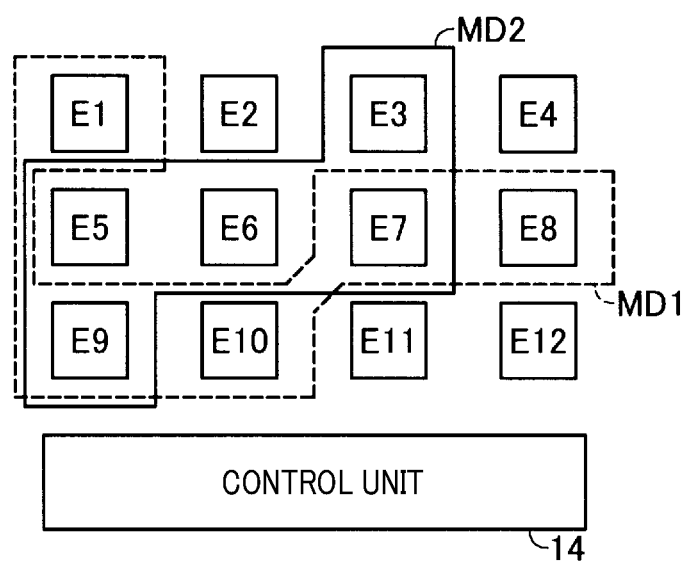
FIG. 4 is a conceptual diagram schematically illustrating another example of how the control unit exchanges data and/or information with the devices upon input/output operations between the control unit 12 and the devices being modularized.

Next, the following describes the second specific example of the first embodiment with reference to FIG. 4.

FIG. 4 schematically illustrates the driving-operation module MD2 in addition to the drive-operation module MD1 for a selected driving operation D2. In FIG. 4, illustration of the arrowed solid lines used in FIGS. 2 and 3 is omitted for facilitating understanding of the driving-operation module MD2.

The modularized set of a sequence of input/output operations used by the driving operation D2 includes input and output operations among the control unit 12 and the devices E3, E5, E6, E7, and E9. That is, the drive-operation module MD2, which corresponds to the driving operation D2, includes the modularized set of the sequence of the input and output operations among the control unit 12 and the devices E3, E5, E6, E7, and E9. That is, the control unit 12 performs or executes the drive-operation module to thereby cause the autonomous vehicle MV to perform the driving operation D2. In contrast, as described above, the drive-operation module MD1, which corresponds to the driving operation D1, includes the modularized set of the sequence of the input and output operations among the control unit 12 and the devices E1, E7, E8, and E9.

As illustrated in FIG. 4, the drive-operation modules MD1 and MD2 are configured to share the input/output operation between the control unit 12 and the device E7, and the input/output operations between the control unit 12 and the device E9. That is, each of the drive-operation modules MD1 and MD2 is modularized to include the shared input/output operations.

Additionally, the autonomous driving control apparatus 10 is configured to devise a travel schedule or plan for the vehicle MV, and cause the vehicle MV, i.e. the driving system 100 of the vehicle MV, to autonomously travel in accordance with the devised travel plan.

Specifically, upon receiving, from the navigation system 29, a destination inputted by, for example, a driver's operation of the input unit 29c, the autonomous driving control apparatus 10 is configured to determine a scheduled travel route from the current position of the vehicle MV to the destination in accordance with, for example, the map information stored in the large-capacity storage 29d or the map information sent from the one or more traffic servers SER.

Next, the autonomous driving control apparatus 10 is configured to determine whether the scheduled travel route includes at least one multiple-lane road that is comprised of two or more lanes for each way. Upon determination that the scheduled travel route includes at least one multiple-lane road, the autonomous driving control apparatus 10 is configured to select one of two or more travel lanes of the at least one multiple-lane road on which the autonomous vehicle MV is scheduled to travel.

For example, the autonomous driving control apparatus 10 can be configured to select a relatively right lane, i.e. a rightmost lane, of the at least one multiple-lane road in a scheduled travelling direction of the autonomous vehicle MV in order to turn right, or select a relatively left lane, i.e. a leftmost lane, of the at least one multiple-lane road in a scheduled travelling direction of the autonomous vehicle MV in order to turn left. As another example, the autonomous driving control apparatus 10 can be configured to select a lane closer to one of branches of the at least one multiple-lane road upon the at least one multiple-lane road being a branch road.

After selection of one of the lanes of the at least one multiple-lane road, the autonomous driving control apparatus 10 applies selected driving-operation modules to the scheduled travel route including the selected lane. That is, the autonomous driving control apparatus 10 selects driving-operation modules in the driving-operation modules MD1 to MDn, which are suitable for the scheduled travel route, and associates or links the combination of the selected driving-operation modules to the scheduled travel route, resulting in the travel plan for the autonomous vehicle MV being determined.

Figure 5:
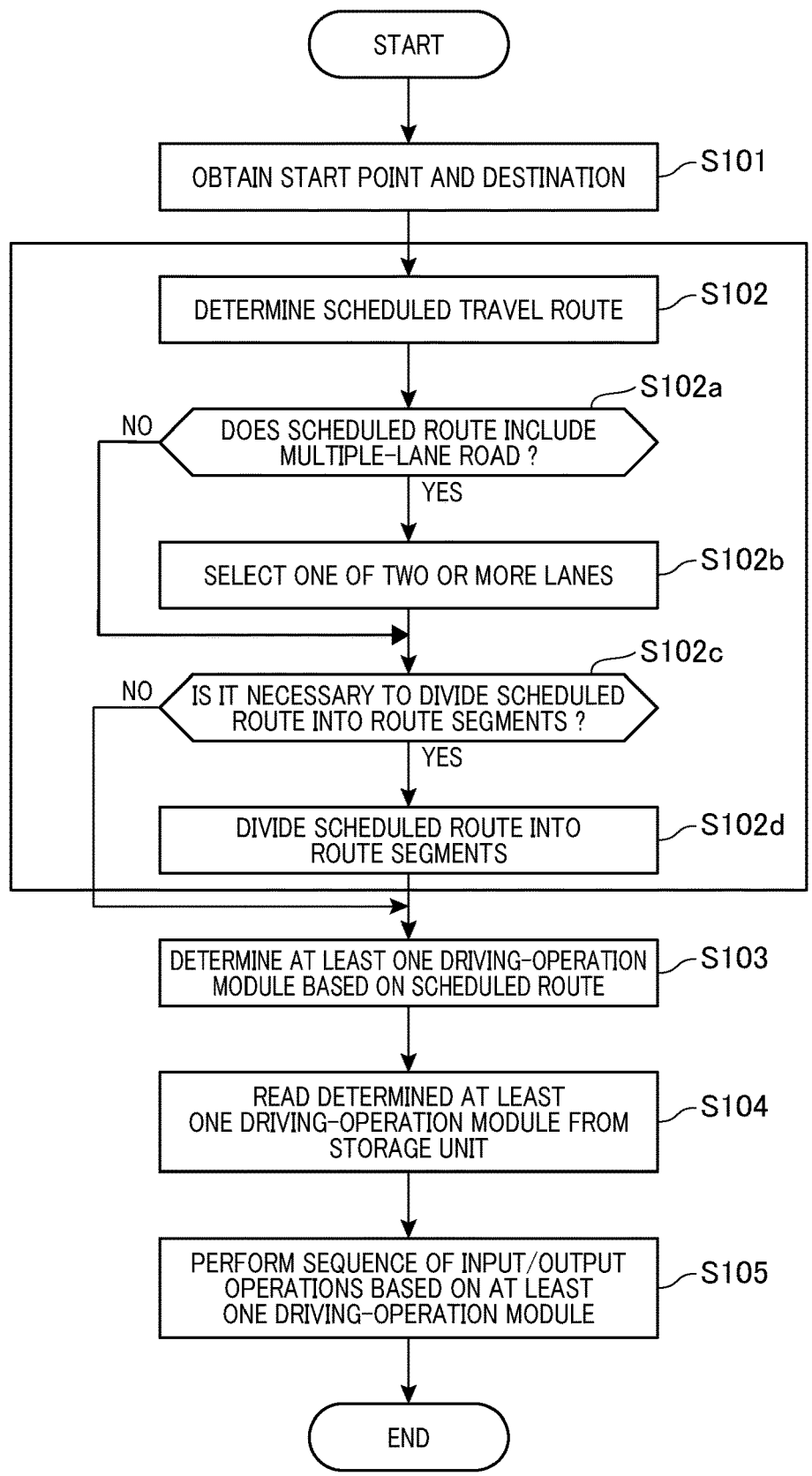
FIG. 5 is a flowchart schematically illustrating an autonomous driving control routine carried out by the autonomous driving control apparatus according to the first embodiment.
Figure 6:
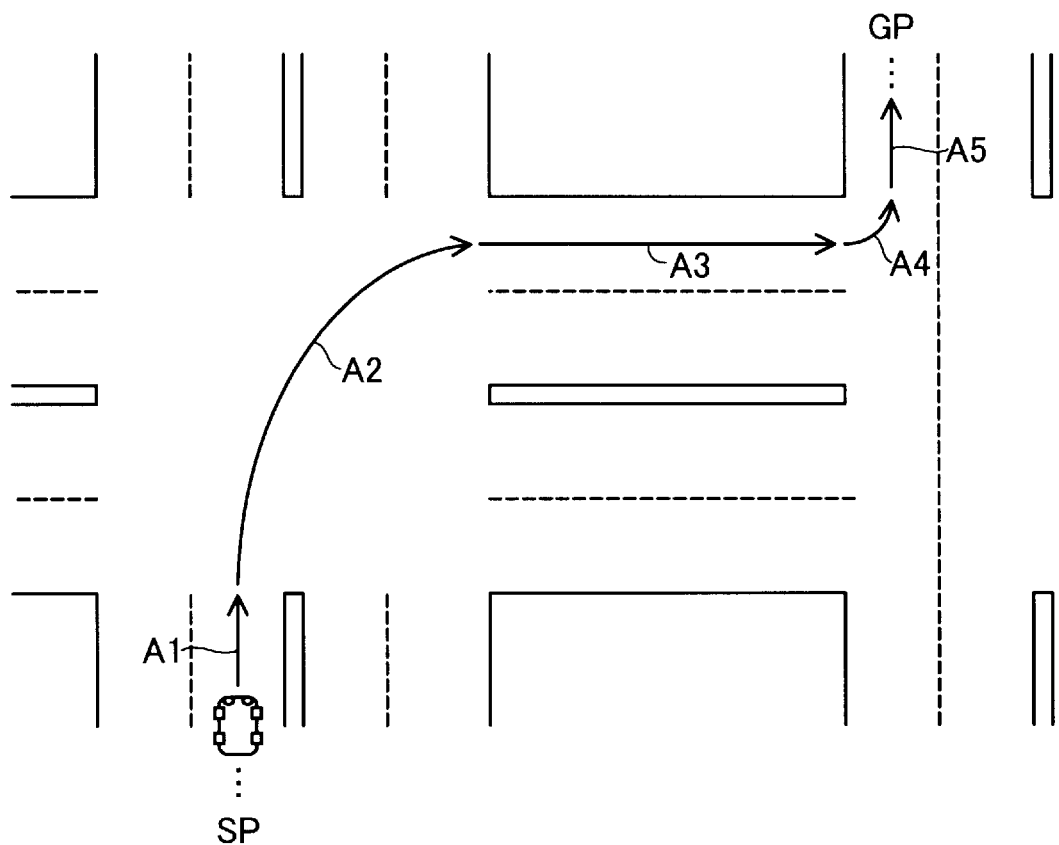
FIG. 6 is a diagram schematically illustrating an example of a scheduled travel route of an example of a travel plan determined in step S102 of FIG. 5.
Figure 7:
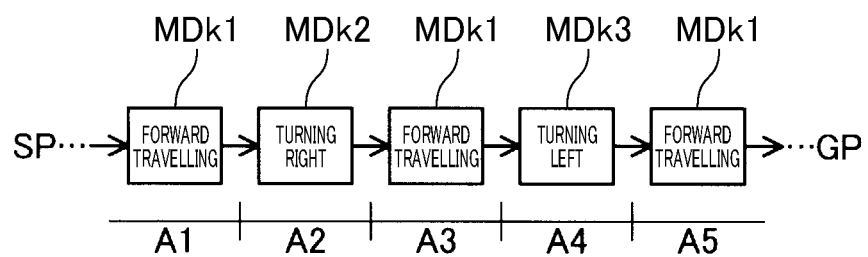
FIG. 7 is a diagram schematically illustrating driving-operation modules applied to the scheduled travel route illustrated in FIG. 6.

The following specifically describes how the autonomous driving control apparatus develops a travel plan for the autonomous vehicle MV, and performs the developed traveling plan with reference to FIGS. 5 to 7.

FIG. 5 is a flowchart schematically illustrating an autonomous driving control routine carried out by the control unit 12 of the autonomous driving control apparatus 10 according to the first embodiment. In other words, at least one control program stored in the storage unit 14 causes the control unit 12 to perform the autonomous driving control routine illustrated in FIG. 5. For example, the control unit 12 executes instructions of the at least one control program stored in the storage unit 14 to thereby execute the autonomous driving control routine each time the operation mode of the autonomous vehicle MV is switched from the manual mode to the autonomous driving mode.

When starting the autonomous driving control routine, the control unit 12 determines a travel plan to be performed by the autonomous vehicle MV in steps S101 to S103 in FIG. 5.

Specifically, the control unit 12 obtains a start point SP, i.e. a current position, of the autonomous vehicle MV in accordance with, for example, the measurement signal sent from the GNSS sensor 23 in step S101. In step S101, the control unit 12 also obtains a destination GP of the autonomous vehicle MV at the start point SP upon receiving the destination GP inputted by, for example, a driver's operation of the input unit 29c of the navigation system 29.

Next, the control unit 12 extracts, from the map information stored in the memory 13 or received from the one or more traffic servers SER, plural travel route candidates from the start point SP to the destination GP, and selects one of the travel route candidates as a scheduled travel route of a travel plan in step S102.

More specifically, in step S102, the control unit 12 determines whether the scheduled travel route includes a multiple-lane road in step S102a. Upon determination that the scheduled travel route does not include multiple-lane roads (NO in step S102a), the autonomous driving control routine proceeds to step S102c.

Otherwise, upon determination that the scheduled travel route includes a multiple-lane road (YES in step S102a), the control unit 12 selects one of the two or more lanes of the multi-lane road in a scheduled travelling direction of the autonomous vehicle MV in step S102b. Thereafter, the autonomous driving control routine proceeds to step S102c.

In step S102c, the control unit 12 determines whether it is necessary to divide the scheduled travel route into at least two route segments between which a currently performed driving operation of the autonomous vehicle MV is required to be switched to a new driving operation thereof.

FIG. 6 schematically illustrates an example of a scheduled travel route of an example of a travel plan determined in step S102 (see reference character STR in FIG. 6). Note that FIG. 6 schematically illustrates a situation where the autonomous vehicle MV is performing autonomous driving on the way to the destination GP from the start point SP.

Because the scheduled travel route includes a first segment A1 during which the autonomous vehicle MV performs forward travelling as its driving operation, and a following second segment A2 during which the autonomous vehicle MV turns right as its driving operation, the driving operation of forward traveling in the first segment A1 is required to be switched to a different driving operation of turning right in the second segment A2.

Similarly, because the scheduled travel route includes a following third segment A3 during which the autonomous vehicle MV performs forward travelling as its driving operation, the driving operation of turning right in the second segment A2 is required to be switched to the driving operation of forward travelling in the third segment A3.

Additionally, because the scheduled travel route includes a following fourth segment A4 during which the autonomous vehicle MV turns left as its driving operation, the driving operation of forward travelling in the third segment A3 is required to be switched to the driving operation of turning left in the fourth segment A4.

Because the scheduled travel route includes a following fifth segment A5 during which the autonomous vehicle MV performs forward travelling as its driving operation, the driving operation of turning left in the fourth segment A4 is required to be switched to the driving operation of forward travelling in the fifth segment A5.

That is, if the scheduled travel route is set to the scheduled travel route STR illustrated in FIG. 6, the control unit 12 determines that it is necessary to divide the scheduled travel route STR into the first to fifth segments A1 to A5 (YES in step S102c), thus dividing the scheduled travel route STR into the first to fifth segments A1 to A5 in step S102d. Thereafter, the autonomous driving control routine proceeds to step S103.

Otherwise, upon determination that it is unnecessary to divide the scheduled travel route into at least two route segments (NO in step S102c), the autonomous driving control routine proceeds to step S103.

In step S103 of FIG. 5, the control unit 12 selects or extracts, from the previously prepared driving-operation modules MD1 to MDn stored in the storage unit 14, at least one driving-operation module that is suitable for the scheduled travel route.

For example, as described above, it is assumed that the control unit 12 divides the scheduled travel route STR into the first to fifth segments A1 to A5 in step S102d.

In this assumption, as illustrated in FIG. 7, the control unit 12 performs, based on the driving-operation modules MD1 to MDn, an operation of selecting 1. A driving-operation module MDk1 associated with the driving operations "forward travelling" to be applied to the first segment A1

2. A driving-operation module MDk2 associated with the driving operation "turning right" to be applied to the second segment A2

3. The driving-operation module MDk1 associated with the driving operations "forward travelling" to be applied to the third segment A3

4. A driving-operation module MDk3 associated with the driving operation "turning left" to be applied to the second segment A4

5. The driving-operation module MDk1 associated with the driving operations "forward travelling" to be applied to the fifth segment A5

That is, the control unit 12 determines a single driving-operation module associated with the scheduled travel route upon determination that it is unnecessary to divide the scheduled travel route into at least two route segments (NO in step S102c), and determines plural driving-operation modules respectively associated with plural route segments upon determination that it is necessary to divide the scheduled travel route into the plural route segments (YES in step S102c).

That is, the operation in step S103 determines the at least one driving-operation module based on the scheduled travel route, thus determining the sequence of input/output operations modularized as the corresponding at least one driving-operation module.

Then, the control unit 12 reads, from the storage unit 104, the at least one driving-operation module determined in step S103, thus reading the sequence of input/output operations modularized as the corresponding at least one driving-operation module in step S104. The sequence of input/output operations modularized as the at least one driving-operation module read in step S104 is required for the autonomous vehicle MV to perform at least one driving operation corresponding to the at least one driving-operation module.

For example, in the above assumption, the control unit 12 reads, from the storage unit 104, the driving-operation modules MDk1, MDk2, MDk1, MDk3, and MDk1 selected in step S103, thus reading the sequence of input/output operations modularized as each of the driving-operation modules MDk1, MDk2, MDk1, MDk3, and MDk1 in step S104.

Following the operation in step S104, the control unit 12 performs, in step S105, the at least one driving-operation module read in step S104, thus performing the sequence of input/output operations included in the corresponding at least one driving-operation module read in step S104. Execution of the sequence of input/output operations included in the corresponding at least one driving-operation module read in step S104 causes the autonomous vehicle MV to autonomously travel along the scheduled travel route to the destination GP.

For example, in step S105, the control unit 12 sequentially performs

1. The sequence of input/output operations modularized as the driving-operation modules MDk1 to thereby cause the autonomous vehicle MV to autonomously perform forward travelling during the route segment A1

2. The sequence of input/output operations modularized as the driving-operation modules MDk2 to thereby cause the autonomous vehicle MV to autonomously perform turning right during the route segment A2

3. The sequence of input/output operations modularized as the driving-operation modules MDk1 to thereby cause the autonomous vehicle MV to autonomously perform forward travelling during the route segment A3

4. The sequence of input/output operations modularized as the driving-operation modules MDk3 to thereby cause the autonomous vehicle MV to autonomously perform turning left during the route segment A4

5. The sequence of input/output operations modularized as the driving-operation modules MDk1 to thereby cause the autonomous vehicle MV to autonomously perform forward travelling during the route segment A5

After the operation in step S105 so that the autonomous vehicle MV has reached the destination GP, the control unit 12 terminates the autonomous driving control routine.

Note that the autonomous driving control apparatus 10 is configured to associate or link the combination of selectively determined continuous driving-operation modules to the scheduled travel route to thereby develop a travel plan for the autonomous vehicle MV. For this reason, the autonomous driving control apparatus 10 can be configured to change the scheduled travel route and/or the combination of the selectively determined continuous driving-operation modules.

As described above, the autonomous driving control apparatus 10 according to the first embodiment is configured to store the various driving-operation modules for the respective driving operations of the autonomous vehicle MV; each of the driving-operation modules is comprised of a modularized set of a sequence of input/output operations used by the corresponding one of the driving operations of the autonomous vehicle MV. This enables the control unit 12 of the autonomous driving control apparatus 10 to associate or link the combination of selectively determined continuous driving-operation modules to the scheduled travel route to thereby develop a travel plan for the autonomous vehicle MV.

Modularizing, for each driving operation, a corresponding sequence of input/output operations used by the corresponding driving operation makes it easy to change input/output operations of the autonomous driving control apparatus 10 in response to change of a previously determined travel plan to another travel plan.

For example, even if a driving operation in a previously determined travel plan becomes unnecessary due to change of the destination GP to another, it is possible to eliminate the driving-operation module corresponding to the unnecessary driving operation from the previously determined travel plan, thus cancelling or halting the sequence of input/output operations included in the corresponding driving-operation module corresponding to the unnecessary driving operation.

As another example, even if it becomes necessary to add a new driving operation to a previously determined travel plan due to change of the destination GP to another, it is possible to add the new driving-operation module to the travel plan to thereby additionally perform the sequence of input/output operations associated with the new driving operation.

If a sequence of input/output operations associated with each driving operation were not modularized as a driving-operation module, it would become necessary to redefine, from scratch, a flow of input/output operations in accordance with the updated travel plan.

In contrast, the autonomous driving control apparatus 10 according to the first embodiment is configured to add or eliminate at least one driving-operation module to or from a previously determined travel plan due to change of the previously determined travel plan, making it possible to address change of a previously determined travel plan without performing complicated operations.

Additionally, modularizing, for each driving operation, a corresponding sequence of input/output operations used by the corresponding driving operation advantageously addresses a case where there is a malfunction or failure in one or more devices connected to the autonomous driving control apparatus 10. Specifically, if such a malfunction or a failure fails to perform input/output operations, the autonomous driving control apparatus 10 identifies at least one driving-operation module including the input/output operations, and eliminates the identified driving-operation module from the previously prepared driving-operation modules that are selectable in step S103. Then, in step S103, the autonomous driving control apparatus 10 selects or extracts, from the remaining driving-operation modules stored in the storage unit 14, at least one driving-operation module that is suitable for the scheduled travel route. The autonomous driving control apparatus 10 therefore makes it possible to, even if there is a malfunction or failure in one or more devices connected to the autonomous driving control apparatus 10, easily determine and perform an alternative travel plan.

As described above, the autonomous driving control apparatus 10 enables the control unit 12 to more efficiently carry out input/output operations modularized to be included in each driving-operation module as compared with non-modularized input/output operations.

Second Embodiment

The following describes an autonomous driving control apparatus 10 according to the second embodiment of the present disclosure with reference to FIGS. 8 to 11. The configuration and functions of the autonomous driving control apparatus 10 according to the second embodiment are mainly different from those of the autonomous driving control apparatus 10 according to the first embodiment by the following points. The following therefore mainly describes the different points.

The autonomous driving control apparatus 10 according to the second embodiment is configured to add or insert, while the control unit 12 is performing the continuous driving-operation modules included in a previously determined travel plan, an additional driving-operation module into the continuously performed driving-operation modules in response to an occupant's request inputted to the apparatus 10; the additional driving-operation module addresses the occupant's request.

Figure 8:
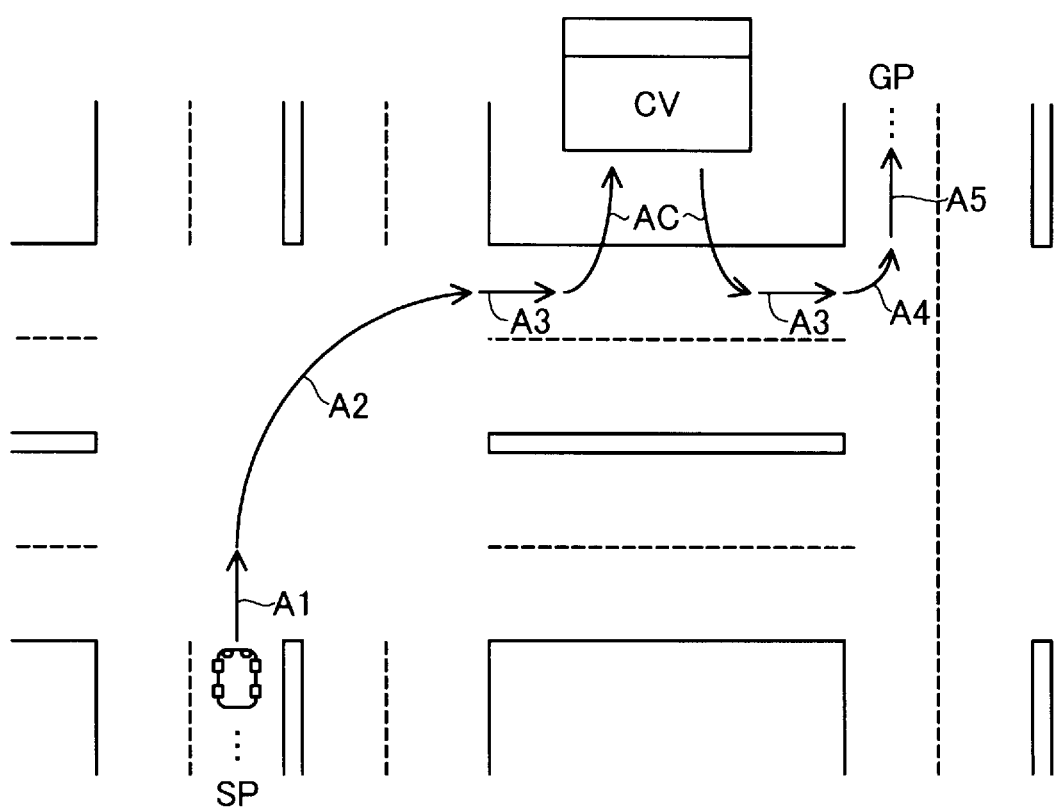
FIG. 8 schematically illustrates an example of an updated travel plan according to the second embodiment of the present disclosure.

FIG. 8 schematically illustrates an example of an updated travel plan according to the second embodiment. Specifically, FIG. 8 illustrates that a previously determined travel plan, which has been being performed by an autonomous vehicle MV illustrated in FIG. 6, is changed or updated to a new travel plan in response to an occupant's request for making a stopover at a convenience store on the halfway of the previously determined travel plan. Note that, like the first embodiment, the autonomous vehicle MV is a vehicle in which the autonomous driving control apparatus 10 and the driving system 100 have been installed.

Specifically, the autonomous driving control apparatus 10 of the second embodiment is configured to add, while the autonomous vehicle MV is autonomously travelling on the route segment A2 of the previously scheduled travel route, an additional driving-operation module to the previously scheduled travel route in response to an occupant's request for making a stopover at a convenience store to thereby change the previously scheduled travel route to a new scheduled travel route. For example, the request is inputted by an occupant with, for example, the input unit 29c or the HMI unit.

Figure 9:
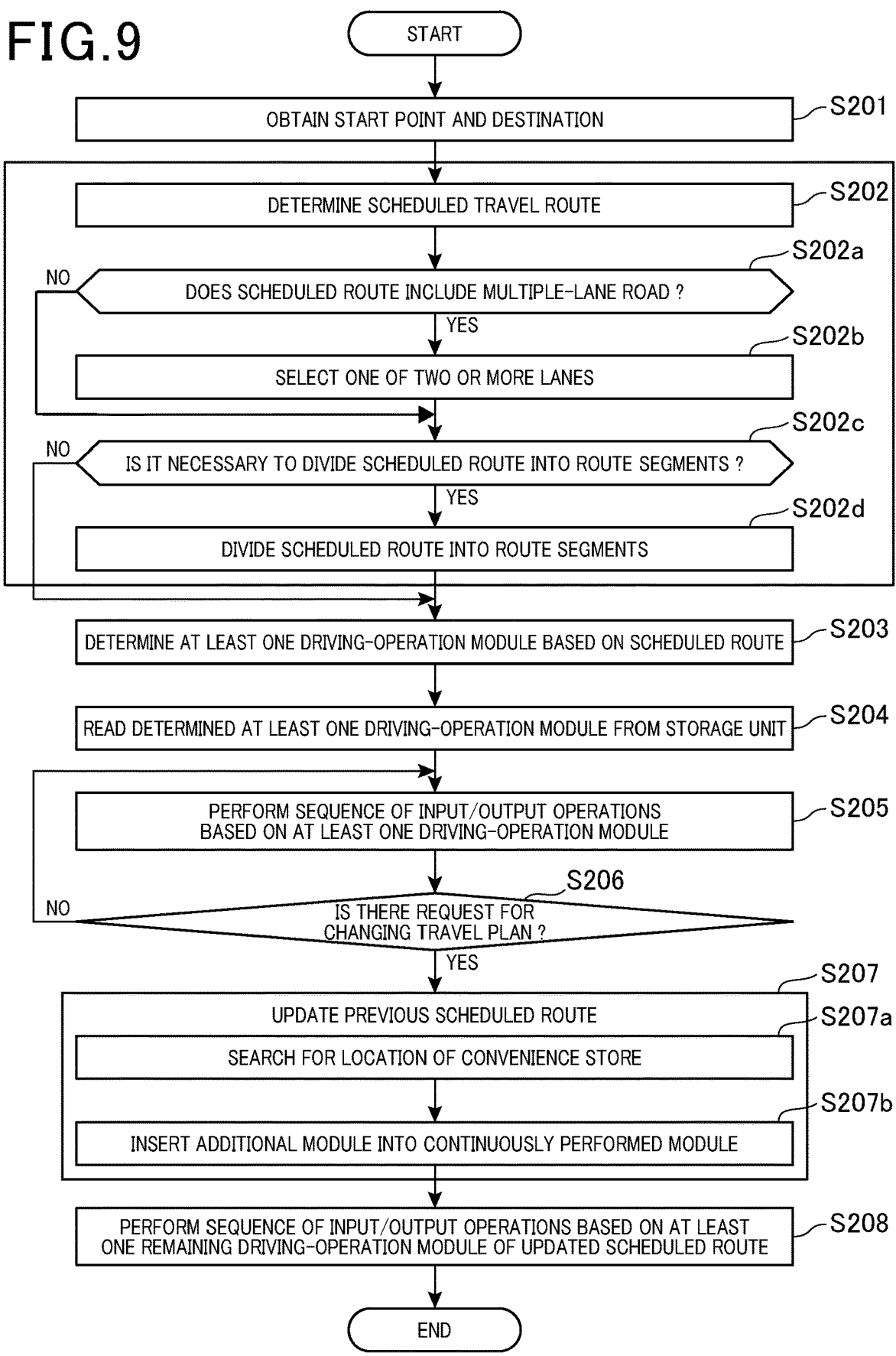
FIG. 9 is a flowchart schematically illustrating an autonomous driving control routine carried out by an autonomous driving control apparatus according to the second embodiment.

The control unit 12 according to the second embodiment is configured to perform an autonomous driving control routine according to the second embodiment with reference to FIG. 9; FIG. 9 is a flowchart schematically illustrating the autonomous driving control routine according to the second embodiment. For example, the control unit 12 executes instructions of an at least one control program stored in the storage unit 14 to thereby execute the autonomous driving control routine according to the second embodiment each time the operation mode of the autonomous vehicle MV is switched from the manual mode to the autonomous driving mode.

Because the operations in steps S201, S202 (S202a to S202d), and S203 to S205 illustrated in FIG. 9 are identical to the respective operations in steps S101, S102 (S102a to S102d), and S103 to S105 illustrated in FIG. 5, duplicated descriptions of the operations in steps S201 to S205 illustrated in FIG. 9 are omitted.

While performing the operation in step S205 to cause the autonomous vehicle MV to autonomously travel along the scheduled travel route to the destination GP, the control unit 12 periodically determines whether an occupant's request for changing the travel plan, i.e. the scheduled travel route, determined in step S202 has occurred in step S206.

Upon determination that no occupant's requests for changing the travel plan, i.e. the scheduled travel route, have occurred (NO in step S206), the control unit 12 continuously performs the operation in step S205 to cause the autonomous vehicle MV to autonomously travel along the scheduled travel route to the destination GP.

Otherwise, upon determination that an occupant's request for changing the travel plan, i.e. the scheduled travel route, has occurred (YES in step S206), the control unit 12 changes the drive-operation modules constituting the scheduled travel route determined in step S202 in accordance with information represented by the occupant's request in step S207.

For example, if the occupant's request for changing the travel plan represents a request for stopping by a convenience store, the control unit 12 performs a searching operation that searches for the location of the nearest convenience store CV in step S207a.

Specifically, in step S207a, the control unit 12 obtains, from the large-capacity storage 29d or the one or more traffic servers SER, the map information, and also obtains, the current position of the autonomous vehicle MV in accordance with, for example, the measurement signal sent from the GNSS sensor 23. Then, in step S207a, the control unit 12 explores the location of the nearest convenience store CV based on the current position of the autonomous vehicle MV and the map information between the current position of the autonomous vehicle MV and the destination GP.

Let us assume, in the first embodiment, that the control unit 12 finds, as a result of the searching operation, the location of the nearest convenience store CV that the autonomous vehicle MV can visit while travelling on the route segment A3 (see FIG. 8).

Figures 10, 11:
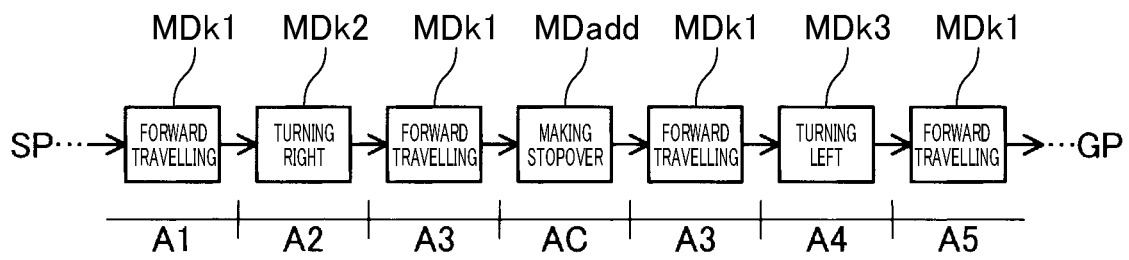
FIG. 10 is a diagram schematically illustrating driving-operation modules applied to the updated scheduled travel route illustrated in FIG. 8.
FIG. 11 is a diagram schematically illustrating an example of the format of how the driving-operation modules being displayed.

Then, as illustrated in FIG. 10, the control unit 12 adds or inserts an additional driving-operation module (see reference character MDadd) into the continuously performed driving-operation modules MDk1, MDk2, MDk1, MDk3, and MDk1 of the scheduled travel route (see FIG. 7); the additional driving-operation module corresponds to a driving operation of "making a stopover at a convenience store", which includes a sequence of input/output operations used by the driving operation of "making a stopover at a convenience store" in step S207b.

Inserting the additional driving-operation module, which causes the autonomous vehicle AV to make a stopover at the convenience store CV, into the continuously performed driving-operation modules of the scheduled travel route (see FIG. 7) results in an additional route segment AC required for the autonomous vehicle MV to make a stopover at the convenience store CV being inserted into the scheduled travel route determined in step S202 (see FIG. 10). That is, the control unit 12 inserts the additional driving-operation module, which causes the autonomous vehicle AV to make a stopover at the convenience store CV, into the continuously performed driving-operation modules of the scheduled travel route, thus updating the previous scheduled travel route into a changed (updated) scheduled travel route in step S207b (S207).

Following the operation in step S207, the control unit 12 performs, in step S208, the remaining driving-operation modules of the updated scheduled travel route, thus performing the sequence of input/output operations included in each of the remaining driving-operation modules of the updated scheduled travel route. Execution of the sequence of input/output operations included in each of the remaining driving-operation modules of the updated scheduled travel route causes the autonomous vehicle MV to autonomously make a stopover at the convenience store CV, and thereafter travel along the updated scheduled travel route to the destination GP.

As described above, the autonomous driving control apparatus 10 according to the second embodiment is configured to easily change, while causing the autonomous vehicle MV to travel along a previously determined scheduled travel route of a previously determined travel plan, the determined travel plan in response to an occupant's request inputted to the apparatus 10. Specifically, the autonomous driving control apparatus 10 according to the second embodiment is configured to add or insert an additional driving-operation module, which addresses the occupant's request, into the continuous driving-operation modules included in the previously determined travel plan, thus updating the previously determined travel plan into a changed or updated travel plan.

Modifications

The present disclosure is not limited to the above first and second embodiments set forth above, and can be variously modified for example as follows.

The autonomous driving control apparatus 10 according to each of the first and second embodiments is installed in an autonomous vehicle, but the present disclosure is not limited thereto.

Specifically, a server communicable with the driving system 1 of an autonomous vehicle can include all functions of the autonomous driving control apparatus 10 according to the first embodiment or the second embodiment. This modification enables the server including the autonomous driving control apparatus 10 to control autonomous driving of the autonomous vehicle, making it possible to achieve the technical effects of each of the first and second embodiments.

The control unit 12 can be configured to display the driving-operation modules on the display unit 29a or another display means installed in the autonomous driving control apparatus 10 or installed in another apparatus connected to the autonomous driving control apparatus.

This configuration enables an occupant in the autonomous vehicle MV to review, for example, the driving-operation module MD1 through the display unit 29a or another display means, thus enabling the occupant to recognize the sequence of input/output operations used by the driving operation D1 corresponding to the driving-operation module MD1. The control unit 12 can be configured to display, on the display unit 29a or another display means, the driving-operation module MD1 in the form of (a) visualization of the conceptual illustration of FIG. 3, or (b) a list or table illustrated in FIG. 11.

The autonomous driving control apparatus 10 according to the second embodiment is configured to update the previously determined travel plan a new travel plan in response to an occupant's request for making a stopover at a convenience store on the halfway of the previously determined travel plan, but the present disclosure is not limited to this configuration.

Specifically, the autonomous driving control apparatus 10 according to the present disclosure can be configured to update the previously determined travel plan to an updated travel plan in response to a request for at least one of 1. Giving an emergency vehicle right-of-way
2. Stopping the autonomous vehicle MV 3. Making a stopover at a service area or parking area while the autonomous vehicle MV is travelling on an expressway That is, in response to a request for giving an emergency vehicle right-of-way in step S207, the autonomous driving control apparatus 10 can be configured to 1. Search for the location of a safe place in the road of the previously scheduled travel route, on which the autonomous vehicle MV is travelling, in which the autonomous vehicle MV can be safely stopped 2. Move the autonomous vehicle MV to the safe place in response to identifying the location of the safe place so as to temporality stop the autonomous vehicle MV in the safe place 3. Return the autonomous vehicle MV to the road of the previously scheduled travel route after enabling the emergency vehicle to pass the autonomous vehicle MV Such a request for giving an emergency vehicle right-of-way can be inputted by an occupant of the autonomous vehicle MV or sent from the emergency vehicle to the autonomous vehicle MV.

In response to a request for stopping the autonomous vehicle MV in step S207, the autonomous driving control apparatus 10 can be configured to 1. Search for the location of a safe place in the road of the previously scheduled travel route, on which the autonomous vehicle MV is travelling, in which the autonomous vehicle MV can be safely stopped 2. Move the autonomous vehicle MV to the safe place in response to identifying the location of the safe place so as to stop the autonomous vehicle MV in the safe place Such a request for stopping the autonomous vehicle MV can be inputted by an occupant of the autonomous vehicle MV or generated by, for example, the driving system 100 of the autonomous vehicle MV itself.

At least part of all functions provided by the control unit 12 can be implemented by at least one processor; the at least one processor can be comprised of (1) The combination of at least one programmed processing unit, i.e. at least one programmed logic circuit, and at least one memory including software that causes the at least one programmed logic circuit to implement all the functions (2) At least one hardwired logic circuit that implements all the functions (3) At least one hardwired-logic and programmed-logic hybrid circuit that implements all the functions While the illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in the embodiment and its modifications can be replaced with a known structure having the same function as the corresponding technical feature. Each of the technical features described in the embodiment and its modifications can also be combined with at least one of the other technical features. At least one of the technical features described in the embodiment and its modifications can further be eliminated unless the at least one of the technical features is described as an essential element in the present specification.

The functions of each of the autonomous driving control apparatuses according to the first and second embodiments can be implemented by various embodiments; the various embodiments include autonomous driving control apparatuses and systems, programs for serving a computer as the functions, storage media, such as non-transitory media, storing the programs, and autonomous driving control methods.

What is claimed is:

1. An autonomous driving control apparatus comprising:
   a control unit configured to control autonomous driving that causes a vehicle to travel along a scheduled travel route; and
   a storage unit configured to previously store a plurality of driving-operation modules independently of the scheduled travel route, each of the driving-operation modules being comprised of a specific sequence of input/output operations used by a corresponding driving operation carried out by the autonomous driving,
   the control unit being configured to:
     determine the scheduled travel route;
     determine, in accordance with the scheduled travel route, at least one selected driving-operation module from the driving-operation modules stored in the storage unit; and
     perform the specific sequence of input/output operations of the at least one selected driving-operation module to thereby cause the vehicle to perform the autonomous driving, wherein
   the specific sequence of input/output operations included in each of the driving-operation modules include each of:
     a first receiving operation of receiving an input from an operation-condition measurement sensor for measuring an operation condition of the vehicle;
     a second receiving operation of receiving an input from a surrounding observation sensor for observing a surrounding condition around the vehicle;
     a first output operation for a notification to an interior or an exterior of the vehicle; and
     a second output operation for controlling the autonomous driving of the vehicle, and
   wherein:
   the specific sequence of input/output operations included in each of the driving-operation modules include:
     a third receiving operation of receiving a selected input from at least one sensor selected from a plurality of sensors installed in the vehicle, the plurality of sensors including the operation-condition measurement sensor and the surrounding observation sensor, the at least one sensor being previously selected as an at least one sensor required for the corresponding driving-operation;
     a third output operation of outputting a specific notification to the interior or the exterior of the vehicle, the selected notification being required for the corresponding driving-operation; and
     a fourth output operation for executing control of the autonomous driving of the vehicle, the control being required for the corresponding driving-operation.

2. The autonomous driving control apparatus according to claim 1, wherein:
   the control unit is configured to:
     determine, as the at least one selected driving-operation module, plural selected driving-operation modules from the driving-operation modules stored in the storage unit in accordance with the scheduled travel route;

perform a combination of the plural selected driving-operation modules to thereby cause the vehicle to perform the autonomous driving; and change the combination of the plural selected driving-operation modules in response to a request for changing the scheduled travel route during execution of the autonomous driving by the vehicle to thereby change the scheduled travel route to a new scheduled travel route.

3. The autonomous driving control apparatus according to claim 2, wherein:

the control unit is configured to:

extract one of the driving-operation modules stored in the storage unit for addressing the request; and insert the extracted driving-operation module into the combination of the plural selected driving-operation modules to thereby change the scheduled travel route to the new scheduled travel route.

4. The autonomous driving control apparatus according to claim 1, wherein:

the control unit is configured to:

determine whether it is necessary to divide the scheduled travel route into at least two route segments between which a currently performed driving operation of the vehicle is required to be switched to a new driving operation thereof;

divide the scheduled travel route into the at least two route segments upon determination that it is necessary to divide the scheduled travel route into the at least two route segments; and extract at least two driving-operation modules from the driving-operation modules stored in the storage unit in accordance with the at least two route segments; and link the extracted at least two driving-operation modules to the respective at least two route segments.

5. A method of controlling a vehicle, the method comprising:

determining a scheduled travel route of a vehicle;

previously storing, in a storage unit, a plurality of driving-operation modules independently of the scheduled travel route, each of the driving-operation modules being comprised of a specific sequence of input/output operations used by a corresponding driving operation carried out by autonomous driving;

determining, in accordance with the scheduled travel route, at least one selected driving-operation module from the plurality of driving-operation modules stored in the storage unit; and performing the specific sequence of input/output operations of the at least one selected driving-operation module to thereby cause the vehicle to perform the autonomous driving, wherein the specific sequence of input/output operations included in each of the driving-operation modules include each of:

a first receiving operation of receiving an input from an operation-condition measurement sensor for measuring an operation condition of the vehicle;

a second receiving operation of receiving an input from a surrounding observation sensor for observing a surrounding condition around the vehicle;

a first output operation for a notification to an interior or an exterior of the vehicle; and a second output operation for controlling the autonomous driving of the vehicle, and wherein:

the specific sequence of input/output operations included in each of the driving-operation modules include:

a third receiving operation of receiving a selected input from at least one sensor selected from a plurality of sensors installed in the vehicle, the plurality of sensors including the operation-condition measurement sensor and the surrounding observation sensor, the at least one sensor being previously selected as an at least one sensor required for the corresponding driving-operation;

a third output operation of outputting a specific notification to the interior or the exterior of the vehicle, the selected notification being required for the corresponding driving-operation; and a fourth output operation for executing control of the autonomous driving of the vehicle, the control being required for the corresponding driving-operation.

6. A non-transitory computer-readable storage medium comprising a set of computer program instructions, the instructions causing a computer to carry out:

a first step of determining a scheduled travel route of a vehicle;

a second step of previously storing, in a storage unit, a plurality of driving-operation modules independently of the scheduled travel route, each of the driving-operation modules being comprised of a specific sequence of input/output operations used by a corresponding driving operation carried out by autonomous driving;

a third step of determining, in accordance with the scheduled travel route, at least one selected driving-operation module from the plurality of driving-operation modules stored in the storage unit; and a fourth step of performing the specific sequence of input/output operations associated with the at least one selected driving-operation module to thereby cause the vehicle to perform the autonomous driving, wherein the specific sequence of input/output operations included in each of the driving-operation modules include each of:

a first receiving operation of receiving an input from an operation-condition measurement sensor for measuring an operation condition of the vehicle;

a second receiving operation of receiving an input from a surrounding observation sensor for observing a surrounding condition around the vehicle;

a first output operation for a notification to an interior or an exterior of the vehicle; and a second output operation for controlling the autonomous driving of the vehicle, and wherein:

the specific sequence of input/output operations included in each of the driving-operation modules include:

a third receiving operation of receiving a selected input from at least one sensor selected from a plurality of sensors installed in the vehicle, the plurality of sensors including the operation-condition measurement sensor and the surrounding observation sensor, the at least one sensor being previously selected as an at least one sensor required for the corresponding driving-operation;

a third output operation of outputting a specific notification to the interior or the exterior of the vehicle, the selected notification being required for the corresponding driving-operation; and a fourth output operation for executing control of the autonomous driving of the vehicle, the control being required for the corresponding driving-operation.

7. An autonomous driving control apparatus comprising:

a control unit configured to control autonomous driving that causes a vehicle to travel along a scheduled travel route; and a storage unit configured to previously store a plurality of driving-operation modules independently of the scheduled travel route, each of the driving-operation modules being comprised of a specific sequence of input/output operations used by a corresponding driving operation carried out by the autonomous driving, the control unit being configured to:

determine the scheduled travel route;

determine, in accordance with the scheduled travel route, at least one selected driving-operation module from the driving-operation modules stored in the storage unit and perform the specific sequence of input/output operations of the at least one selected driving-operation module to thereby cause the vehicle to perform the autonomous driving, wherein the specific sequence of input/output operations included in each of the driving-operation modules include each of:

a first receiving operation of receiving an input from an operation-condition measurement sensor for measuring an operation condition of the vehicle;

a second receiving operation of receiving an input from a surrounding observation sensor for observing a surrounding condition around the vehicle;

a first output operation for a notification to an interior or an exterior of the vehicle; and a second output operation for controlling the autonomous driving of the vehicle, and wherein:

the driving-operation modules include a forward driving-operation module corresponding to forward traveling;

the specific sequence of input/output operations included in the forward driving-operation module include:

plural receiving operations that receive at least one of a camera, a millimeter-wave radar, and a LiDAR sensor installed in the vehicle, the camera, millimeter-wave radar, and the LiDAR sensor being required for the forward traveling;

a first instruction operation for detecting lane markers on a road on which the vehicle is traveling in accordance with information measured by the at least one of the camera, millimeter-wave radar, and the LiDAR sensor; and a second instruction operation for outputting a steering control instruction determined based on the lane markers and a current position of the vehicle.

\* \* \* \* \*